United States Patent [19]

Nishikura et al.

[11] Patent Number: 5,457,351
[45] Date of Patent: Oct. 10, 1995

[54] ULTRASONIC MOTOR

[75] Inventors: Takahiro Nishikura, Ikoma; Katsu Takeda, Osaka; Masanori Sumihara, Higashiosaka; Osamu Kawasaki, Tsuzuki, all of Japan

[73] Assignee: Matsushita Electric Industrial Co., Ltd., Osaka, Japan

[21] Appl. No.: 200,002

[22] Filed: Feb. 22, 1994

Related U.S. Application Data

[63] Continuation-in-part of Ser. No. 969,367, Oct. 30, 1992, abandoned.

[30] Foreign Application Priority Data

Oct. 31, 1991 [JP] Japan .................................. 3-285922

[51] Int. Cl.⁶ .................................................. H01L 41/08
[52] U.S. Cl. ................................................................. 310/323
[58] Field of Search ........................................ 320/323, 328

[56] References Cited

U.S. PATENT DOCUMENTS

| | | | |
|---|---|---|---|
| 5,006,746 | 4/1991 | Kasuga et al. | 310/323 |
| 5,013,956 | 5/1991 | Kurozumi et al. | 310/323 |
| 5,025,186 | 6/1991 | Tsukada | 310/323 |
| 5,056,201 | 10/1991 | Kasuga et al. | 310/323 |
| 5,079,470 | 1/1992 | Kasuga et al. | 310/323 |
| 5,091,670 | 2/1992 | Kawata et al. | 310/323 |
| 5,187,406 | 2/1993 | Seki | 310/323 |
| 5,254,899 | 10/1993 | Suzuki et al. | 310/323 |

Primary Examiner—Mark O. Budd
Attorney, Agent, or Firm—Wenderoth, Lind & Ponack

[57] ABSTRACT

A position where the projection member is disposed is optimized by the product of a vibration displacement distribution of a vibration member composed of an elastic member for exciting the primary elastic progressive waves or more in the radial direction and the tertiary elastic progressive waves or more in the peripheral direction, and a generation force distribution of a vibration member to be caused in accordance with the pressure force so that the motor output is made larger. The construction is optional in accordance with the necessary characteristics, and the characteristics are superior by the shape of the supporting means of the vibrating member and the vibration member, thus providing an ultrasonic motor of higher stability.

10 Claims, 16 Drawing Sheets

10 CONTROL CIRCUIT

ULTRASONIC MOTOR

This is a continuation-in-part application in connection with the U.S. patent application Ser. No. 07/969,367 filed on Oct. 30, 1992 now abandoned.

BACKGROUND OF THE INVENTION

1. Field of the Invention

The present invention relates to a supporting means for an ultrasonic motor for generating driving force by the use of elastic vibrations excited by anti-piezoelectric effects of a piezoelectric member.

2. Description of the Related Arts

In recent years, an ultrasonic motor is watched where elastic vibrations are excited in a vibration member with the use of a piezoelectric member such as peizoelectric ceramic or the like so as to make them as driving force.

A conventional ultrasonic motor will be described hereinafter in detail with reference to drawings.

FIG. 1 is a sectional view showing the construction of the conventional ultrasonic motor. Referring now to FIG. 1, reference numeral 1 is a ring shaped elastic member composed of material such as metal, ceramic or the like, reference numeral 2 is a ring shaped piezoelectric member, reference numeral 3 is a stator composed of an elastic member 1 and a piezoelectric member 2 stuck to each other. The elastic body 1 has a projection portion 4 of the same diameter disposed on it. Reference numeral 5 is a disk-shaped support member of a thin plate so as to support the stator. Reference numeral 6 is a rotor composed of a construction similar to that of the stator 4. Reference numeral 7 indicates two bearings each having a rotary shaft 8 penetrated through a central hole of the bearing 7. Reference numeral 9 is a housing, reference numeral 10 is a control circuit for driving, controlling the stator 3.

In FIG. 1, when an alternating current voltage is applied on a piezoelectric member 2 from a control circuit, standing waves of a primary bending vibration mode or more in the radial direction, and a tertiary bending vibration mode or more in the peripheral direction, having a vibration displacement distribution in the radial direction as shown in FIG. 2 are excited in the stator 3. In order to secure it in a position where the vibration loss is small, a disk-shaped support member 5 is disposed near a neutral face of the stator 3. The stator is secured to the housing 9 at the inner peripheral portion thereof. When two standing waves having a given phase difference are excited in the ring shaped stator 3, progressing waves of bending vibrations which are progressing in the peripheral direction are excited in the stator 3. A rotor 6 which is disposed in pressure contact with the projecting portion 4 of the stator 3 is driven by a frictional force created by the progressing waves and the rotary shaft 8 is mechanically coupled to the rotor 6. As the shaft is retained by two bearings 7, the rotary shaft 8 is rotated.

FIG. 3 is a view indicating one example of a driving electrode construction of a piezoelectric member 2 used for an ultrasonic motor of FIG. 1. FIG. 3 indicates an electrode construction where nine elastic waves are excited in the peripheral direction. Reference characters A and B respectively designate groups of electrodes each corresponding to one-half of a wavelength. Reference character C designates an electrode corresponding to three fourths of a wavelength, reference character D designates an electrode corresponding to one fourth of a wavelength. Electrodes C and D are provided to cause a phase difference of one fourth of a wavelength (=90 degrees) in position between the electrode groups A and B. Small electrode portions adjacent within the electrodes A and B are polarized in a thickness direction opposite to each other. A face at which the piezoelectric member 2 is bonded to the elastic member is with respect to an elastic member 1 of a piezoelectric member 2 is opposite to a face shown in FIG. 3. An electrode is a non-segmented electrode. At a driving operation time, the electrode groups A and B are respectively short-circuited and used as shown with the oblique lines in FIG. 3.

The conventional ultrasonic motor constructed as described hereinabove will be described hereinafter in its operation. Voltages V1 and V2 represented by equations (1), (2) are respectively applied upon the groups of electrodes A and B of the piezoelectric member 2 of the ultrasonic motor.

$$V_1 = V_0 \times \sin(\omega t) \tag{1}$$

$$V_2 = V_0 \times \cos(\omega t) \tag{2}$$

where $V_0$ is an instantaneous value of the voltage, $\omega$ is an angular frequency, t is time.

Therefore, the progressive waves of the bending vibrations in the circumferential direction represented by an equation (3) are excited in the stator 3.

$$\begin{aligned} \epsilon &= \epsilon_0 \times \{\cos(\omega t) \times \cos(kx) + \sin(\omega t) \times \sin(kx)\} \\ &= \epsilon_0 \times \cos(\omega t - kx) \end{aligned} \tag{3}$$

wherein $\epsilon$ is an amplitude value of the bending vibrations, $\epsilon_0$ is an instantaneous value of the bending vibrations, k is a ratio $(2\pi/\lambda)$, $\lambda$ is a wavelength, x is a position.

FIG. 4 indicates the movement of an elliptic track of 2 w in vertical axis and 2 u in lateral axis to be obtained by the excitation of the progressive wave at a point A on the surface of the stator 3. A rotor 6 set pressed onto the stator 3 comes near a vertex of the elliptic track 11 so as to move at a speed v of an equation (4) in a direction opposite to the wave progressive direction by a frictional force.

$$v = \omega \times u \tag{4}$$

In the construction of the conventional ultrasonic motor, a disc-shaped support member 5 has to be formed by a method of splicing it with the stator 3 or to be worked at the same time. At the splicing operation, an uneven vibration distribution is likely to be caused because of inequalities in mechanical strength at the splicing portion. At an integral working operation, lower mass production is caused because of working precision and a working operation to be effected from both the faces of the stator 3. As shown in FIG. 1, the conventional construction has a problem in that the vibrations of the stator are large influenced with respect to change in motor shape and pressure force of the rotor so that the vibration displacement distribution in the radial direction shown in FIG. 2 cannot be retained, thus resulting in considerable output reduction, because the projection portion 4 has the same diameter as that of the stator 3 in a maximum position of the vibration change quantity without fail.

SUMMARY OF THE INVENTION

Accordingly, the present invention has been developed with a view to substantially eliminating the above discussed drawbacks inherent in the prior art, and has for its essential object to provide an improved ultrasonic motor.

An important object of the present invention is to provide an improved ultrasonic motor which can obtain to maximum the output of the vibration member by provision of a projection member in a position to be determined by the product of generating force of the vibration member and the speed with respect to an external load to be applied upon the vibration member as a pressure force to be determined by a desired mechanical output (torque) in an optional disc-shaped vibration member.

A first ultrasonic motor of the present invention has a projection member in a position, where the product of the speed distribution (time differential of the vibration displacement distribution) in the radial direction and the generating force distribution in the radial direction of the vibration member with respect to a pressure force to be determined by the desired mechanical output (torque) becomes maximum, in a vibration member having a uniform thickness for exciting the primary elastic vibrations or more in the radial direction, and the tertiary elastic vibrations or more in the peripheral direction.

A second ultrasonic motor has a projection member in a position, where the product of the speed distribution (time differential of the vibration displacement distribution) in a radial direction and the generating force distribution of the vibration member in the radial direction with respect to the pressure force to be determined by the desired mechanical output (torque) becomes maximum, in a vibration member where the thickness of the vibration member of a face opposite to a piezoelectric member adhered face is unequal in the radial direction and equal in the peripheral direction, the primary elastic vibration or more in the radial direction and the tertiary elastic vibration or more in the peripheral direction are excited.

An ultrasonic motor is realized which is capable of obtaining outputs effectively and stably by a projection member provided on the vibration member by the first construction.

A vibration member is provided, where the same inside, output diameters are provided, a projection member position to be determined by the product of the vibration displacement distribution by the generating force distribution can be optionally changed by an vibrating member of unequal thickness in the radial direction with respect to the vibration member having the uniform thickness receiving the same pressure force, by the second construction. An ultrasonic motor can be realized where design freedom degree is large.

BRIEF DESCRIPTION OF THE DRAWINGS

These and other objects and features of the present invention will become apparent from the following description of the preferred embodiment thereof made with reference to the accompanying drawings, in which.

DETAILED DESCRIPTION OF THE PREFERRED EMBODIMENTS

Figure 1:
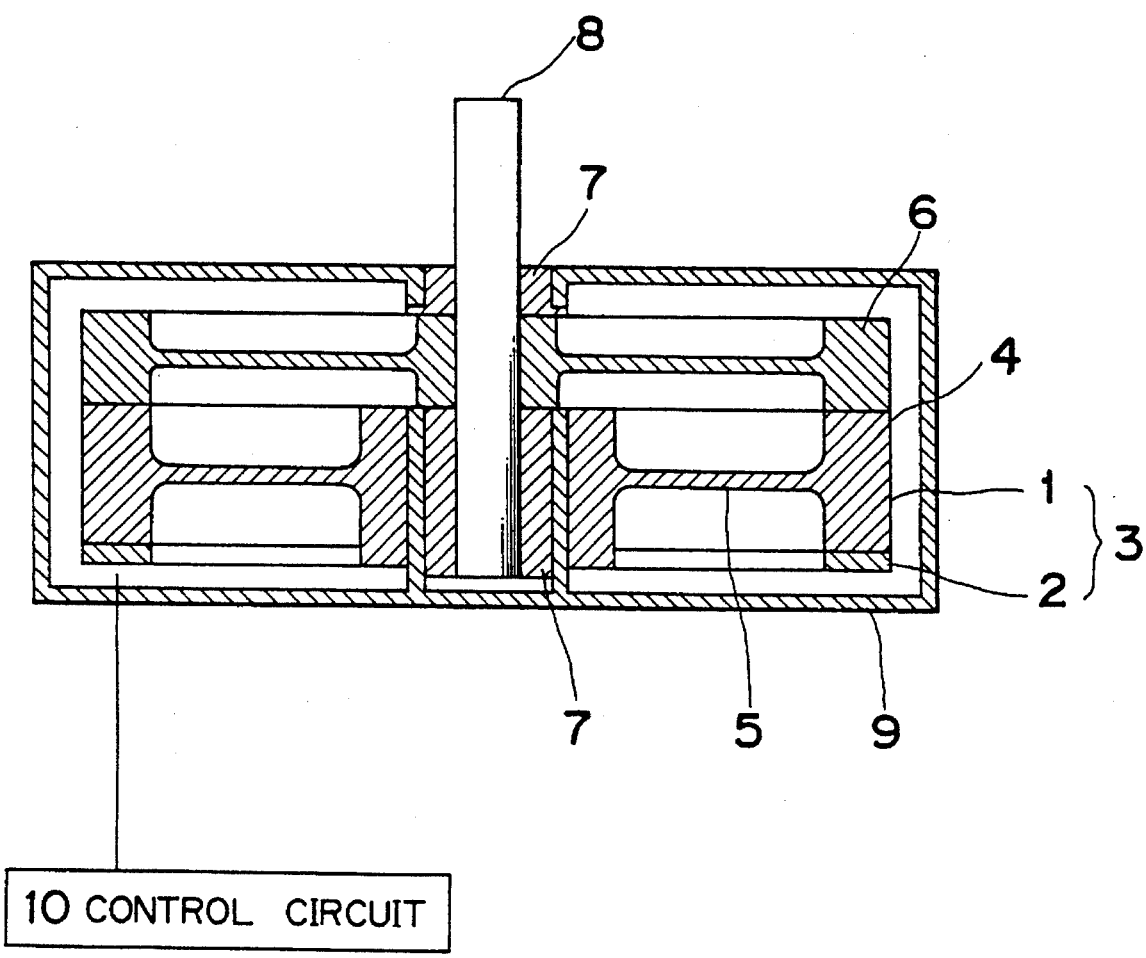
FIG. 1 is a sectional view of a conventional ultrasonic motor.

Before the description of the present invention proceeds, it is to be noted that like parts are designed by like reference numerals through the accompanying drawings.

A first embodiment of the present invention will be described hereinafter in detail with reference to the drawings.

Figure 5:
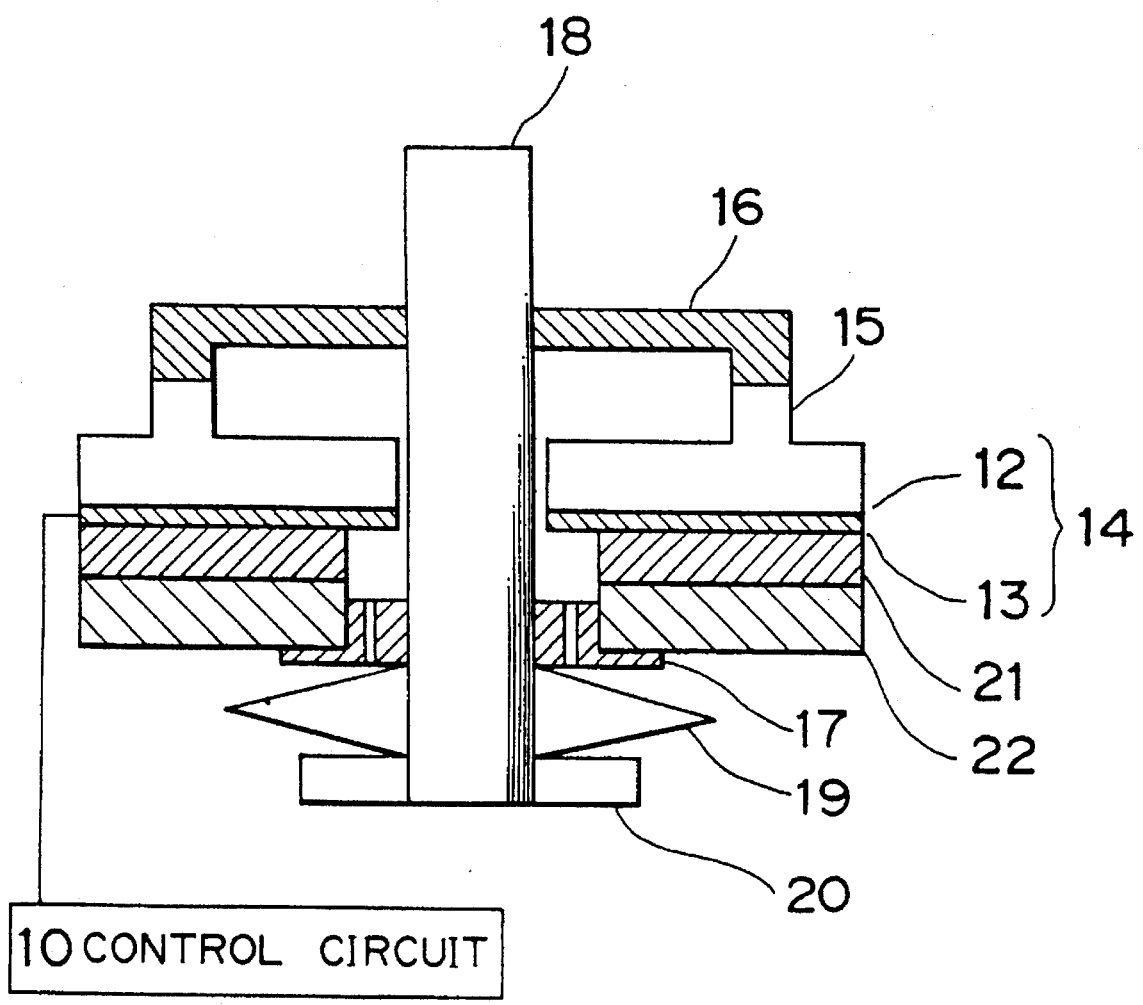
FIG. 5 is a sectional view of an ultrasonic motor in a first embodiment of the present invention.
Figure 6:
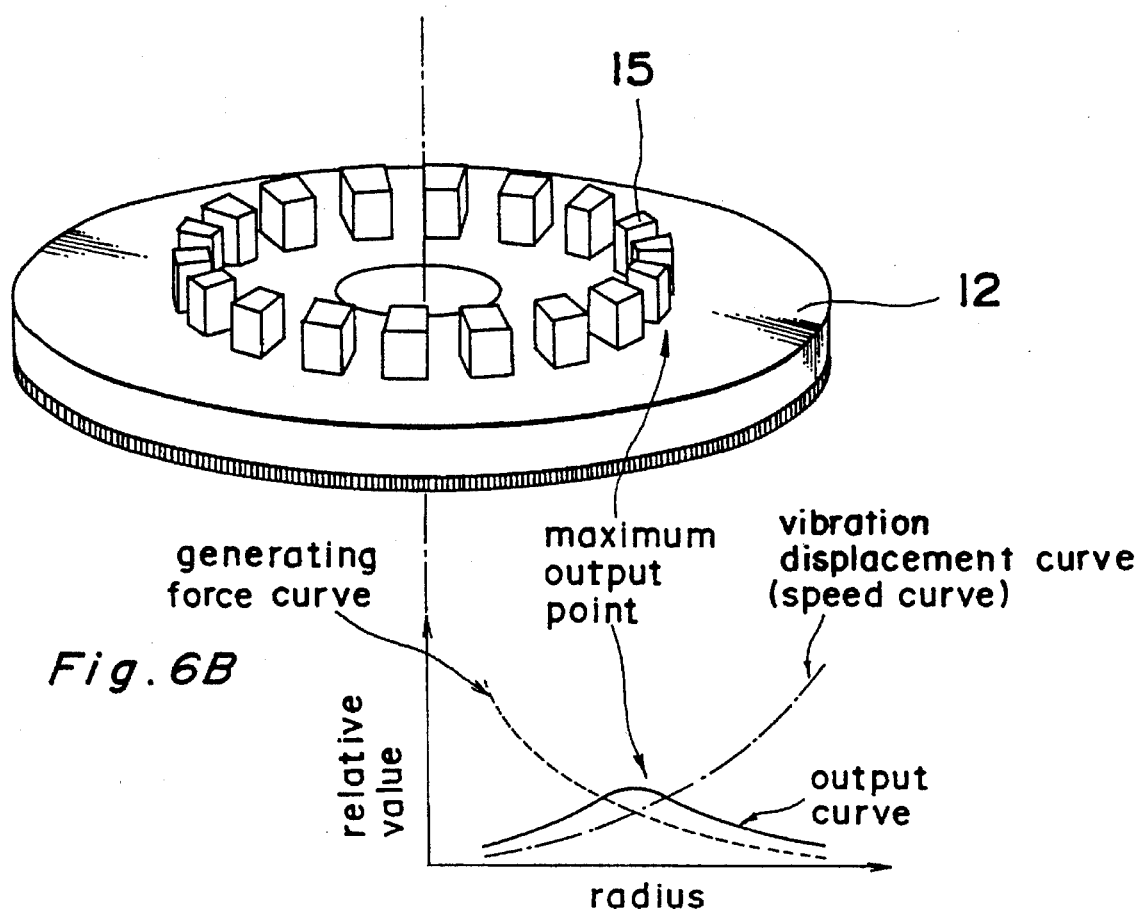
FIG. 6A is a perspective view showing the construction of a vibration member of the ultrasonic motor showing a first embodiment of the present invention.
FIG. 6B is an explanatory diagram for determining a projection member position of a vibration member of FIG. 6A.

FIG. 5 is a sectional view showing the construction of an ultrasonic motor in the first embodiment of the present application invention. FIG. 6(a) is a perspective view showing a vibration member 14 of an ultrasonic motor to be used in the same embodiment. FIG. 6(b) is an explanatory diagram of a principle for determining a projection member position on a vibration member.

In FIG. 5, reference numeral 12 designates an elastic member, reference numeral 13 designates a piezoelectric member, reference numeral 14 designates a vibration member having an elastic member 12 fixed onto the piezoelectric member 13. The projection member 15 is formed on the elastic member 12. A position where the projection member is formed will be described later.

Reference numeral 16 is a moving member which is brought into pressure contact with the projection member 15 of the elastic member 12, reference numeral 17 designates a bearing for rotatably supporting a rotary shaft 18 fixed integrally with the moving member 16, reference numeral 19 is a spring disposed in compression condition between a spring hold tap 20 and the bearing 17, the moving member 16 being brought into pressure contact with the vibration member 14 by the elastic force of the spring 19. The vibration member 14 is secured to a support stand 22 through a support member which is an elastic material.

The ultrasonic motor composed as described hereinabove will be described hereinafter in the construction and the operation of the vibrator 14.

The vibration member 14 is composed of a disc-shaped elastic member 12 having a uniform thickness, and a piezoelectric member 13 adhered on an single face of the elastic member 12. The elastic member 12 has a projection member 15 provided in a position determined in accordance with a principal shown in FIG. 6(b) on the surface.

The arrangement position of the projection member will be described about how to determine the position with reference to FIG. 6A. The description will be given where a primary vibration mode in a radial direction is being excited in the vibration member 14.

FIG. 6B shows a vibration displacement curve when the primary vibration mode has been excited in a radial direction, and a force in a radial direction to be generated by the vibration member 14 in a condition where a pressure force has been applied upon the vibration member 14 by a spring 19. Pressure force to be applied upon the vibration member 14 by the spring 19 is determined by an output torque to be demanded as a characteristic of the ultrasonic motor.

An output which can be outputted by the vibration member 14 can be obtained from the following relation.

Output=speed×force

A product of the speed distribution (time differential of the vibration displacement distribution) in a radial direction of FIG. 6B and the generating force distribution, because the speed is the time differential of the vibration displacement. If the projection member 15 is disposed in the maximum point of the output curve, the output of the ultrasonic motor can be made maximum with respect to the pressure force to be determined in one meaning with respect to the necessary torque.

The vibration member 14 where a projection member 15 is disposed in an optimum position by the above described method is secured to a support stand 22 through an elastic member 21. It is preferable to use a buffer material composed of an insulating material containing an air space as an elastic material. Felt is much preferable to use as a buffer material.

The reason for it is that the vibration member can be secured to the support stand 22 by retaining the electric insulation from the support stand 22 without interfering with the elastic vibrations to excited by the piezoelectric member 13.

Such a buffer material has an effect of making a contact uniform between the moving member 16 and a projection member 15 on the vibration member 14 equal in condition. In other words, a buffer material is elastically deformed so that the uniform pressure contact between the moving member and the vibration member can be realized.

Although the vibration member 14 receives the force by which the vibration member is rotated in a direction opposite to the moving member, the rotation in a direction opposite to it is positively prevented by the frictional contact with the buffer material so that the vibrator 14 can be positively secured in a stationary condition with respect to the support stand 22.

Figure 2:
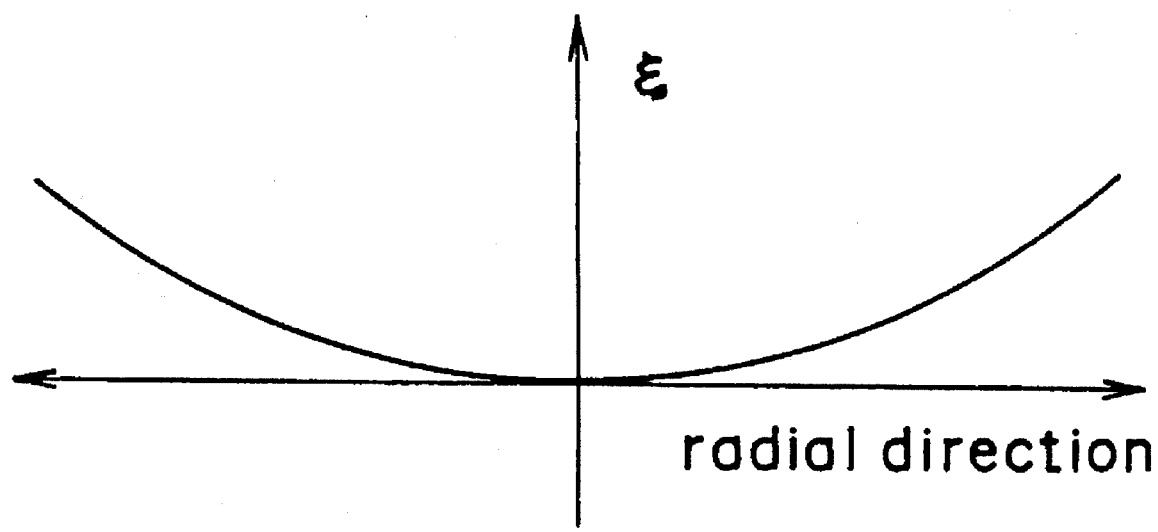
FIG. 2 is a view showing a primary vibration displacement distribution in a radial direction of the ultrasonic motor.
Figure 3:
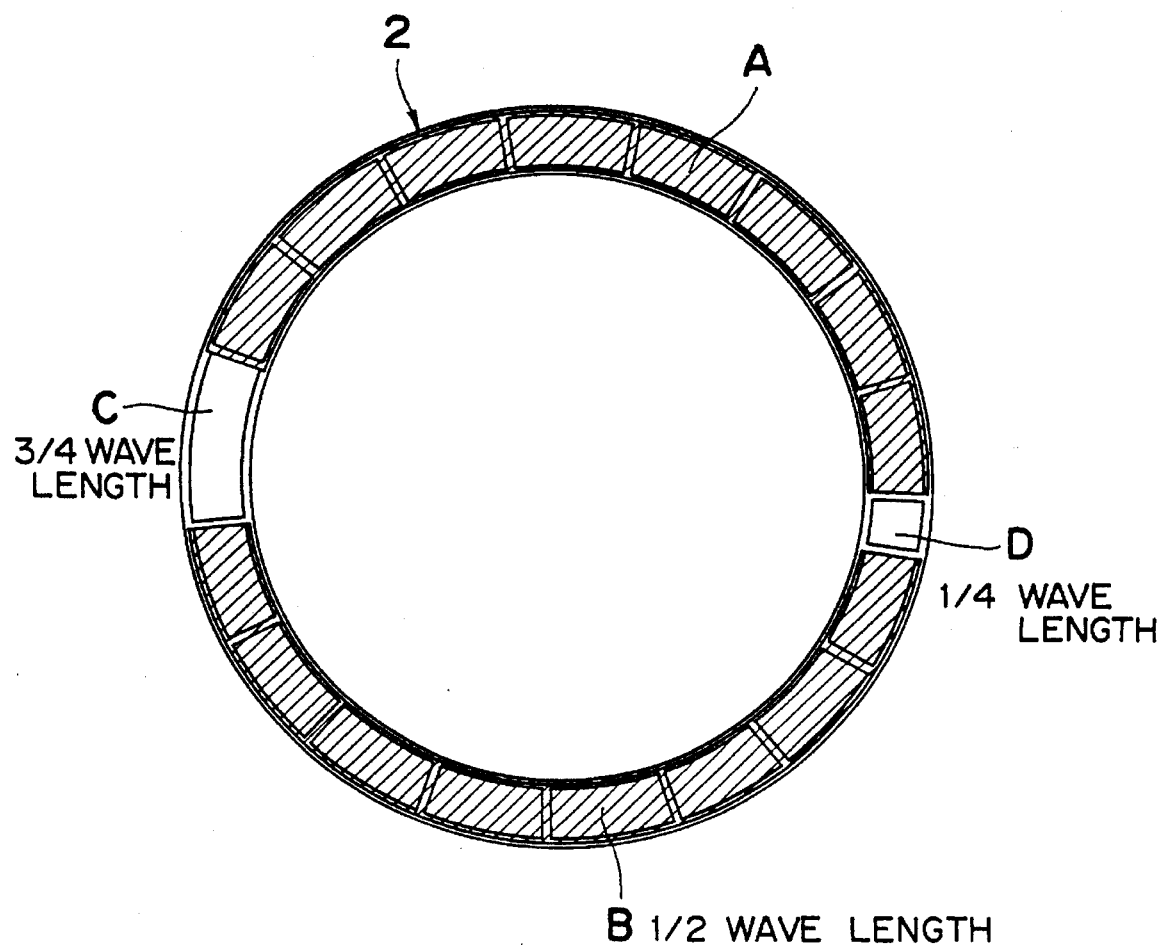
FIG. 3 is a diagram of a piezoelectric member to be used in the ultrasonic motor.
Figure 4:
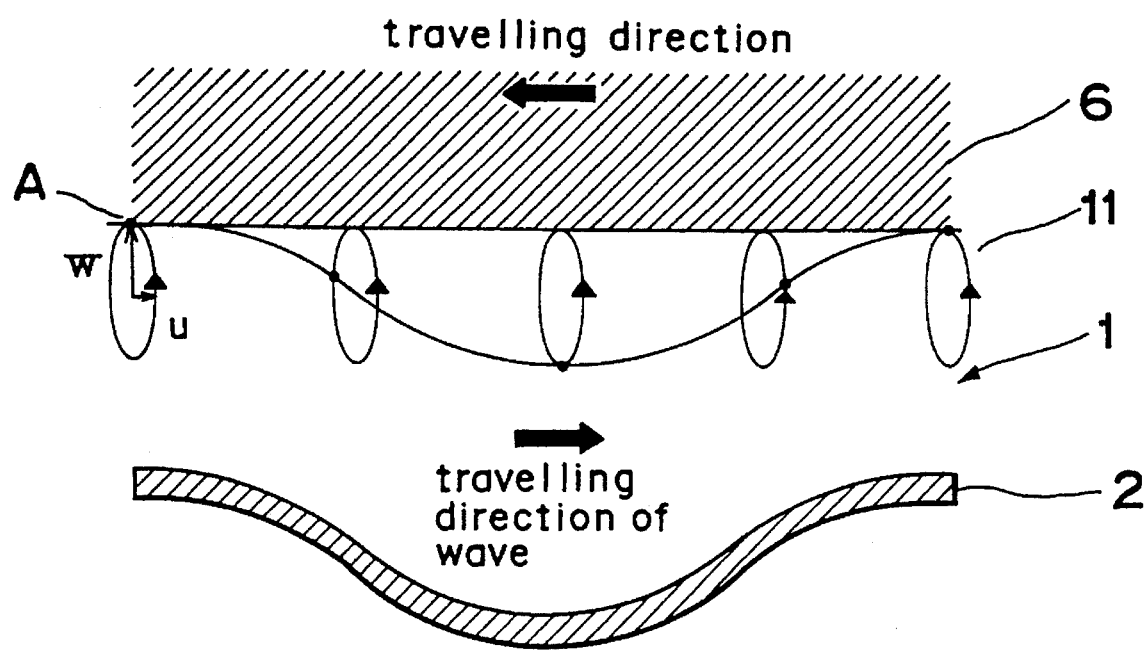
FIG. 4 is an explanatory diagram showing the operation principle of the ultrasonic motor.

When an alternating current voltage having a phase difference of ninety degrees is supplied by the control circuit 10 to groups of driving electrodes A, B formed on the piezoelectric member 13 as shown in FIG. 2 in an ultrasonic motor constructed as described hereinabove, the primary elastic progressive waves or more in the radial direction, and the tertiary elastic progressive waves or more in the peripheral direction are excited in the vibration member 14. The moving member 16 which has been brought into pressure contact with the projection member 15 is frictionally driven by the fronts of the progressive wave so as to effect an rotating motion.

The moving member 16 and the rotary shaft 18 are substantially integrally combined by, for example, a pressure insertion method, and an output is drawn out externally by the rotary shaft supported for its rotatable operation by the bearing 17.

In accordance to the present embodiment, a projection member 15 is disposed in a position of a maximum point of the output curve to be determined by the vibration displacement distribution and the generating force distribution in a vibration member 14 which is disc-shaped in optional size and uniform in thickness so that an ultrasonic motor of larger output and better efficiency can be realized.

One of especially superior points of the ultrasonic motor in the present embodiment is in that an extremely stable operation can be effected. A reason for it is that the moving member 16 and the vibration member 14 can come into pressure contact with each other in an extremely equal condition by the use of the above described buffer material composed of felt or the like for the support member 21. In other words, a buffer material is elastically deformed so that the moving member 16 and the vibrating member 14 come into uniform pressure contact with each other.

As the ultrasonic motor causes vibrations of extremely minute amplitude of approximate 1 μm at most in the vibrating member so as to drive the moving member which comes into contact at an apex of the amplitude of the vibration, the importance in the equal contact between the moving member and the vibrating member will be easily realized.

When the equal contact is not realized, loads to be applied upon the vibrating member by the moving member are varied in terms of time. As the result, the vibrating system including the vibrating member is varied in terms of time so that it becomes extremely difficult to realize the stable operation.

When the number of high revolutions is required in a small output torque, the pressure force of the moving member to be applied upon the vibrating member can be made smaller. Thus, a generation force distribution curve shown in FIG. 6 (b) becomes gentler so that the difference in the generating force between the central portion of the vibrating member and the external peripheral portion.

Figure 7:
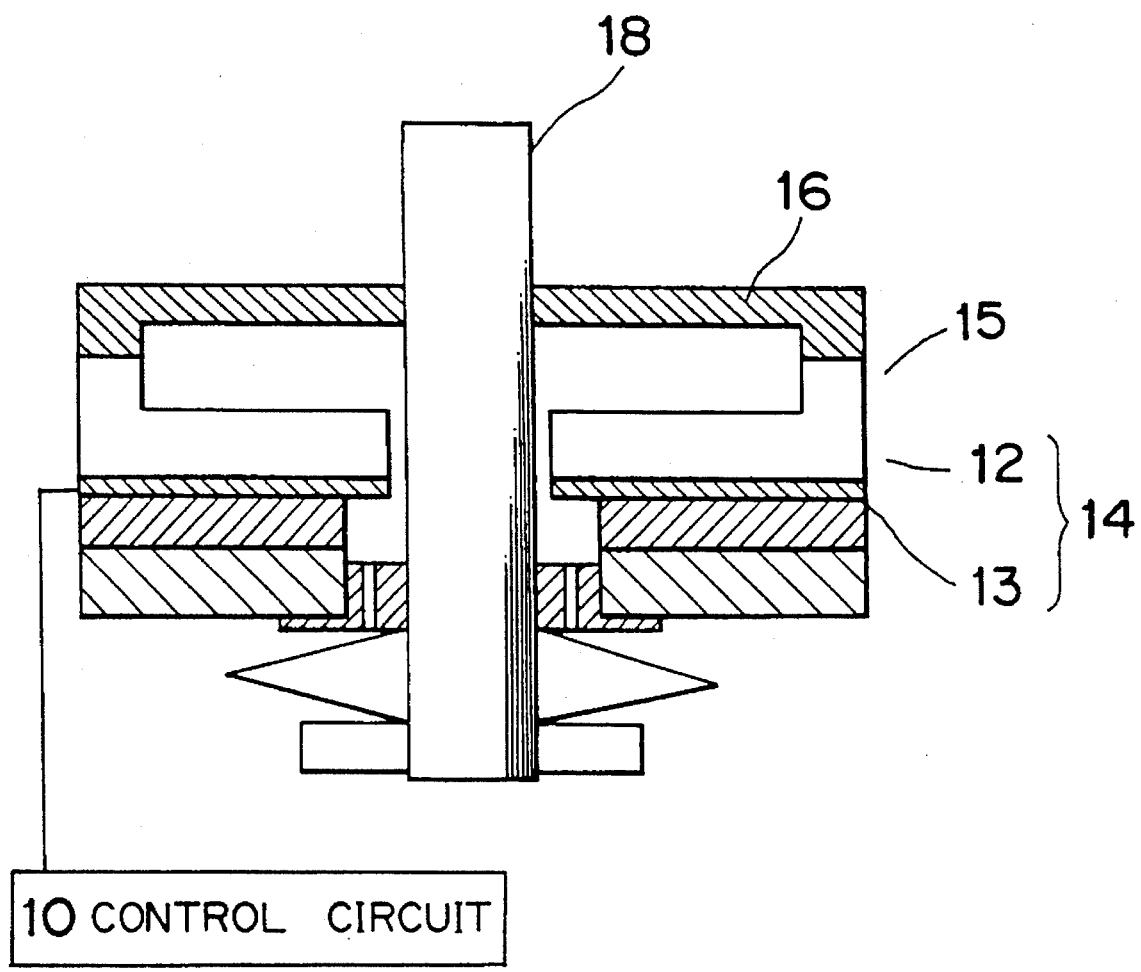
FIG. 7 is a sectional view of an ultrasonic motor showing another construction in the first embodiment of the present invention.

As the maximum value of the output curve is to be positioned near the external peripheral portion, it is needless to say that the projecting member 15 can be correspondingly disposed in the external peripheral portion. A construction view of an ultrasonic motor in such a case is shown in FIG. 7. An ultrasonic motor of number of high revolutions in the low torque can be realized by the construction.

A second embodiment of the present invention will be described hereinafter in detail with reference to he drawings.

Figure 8:
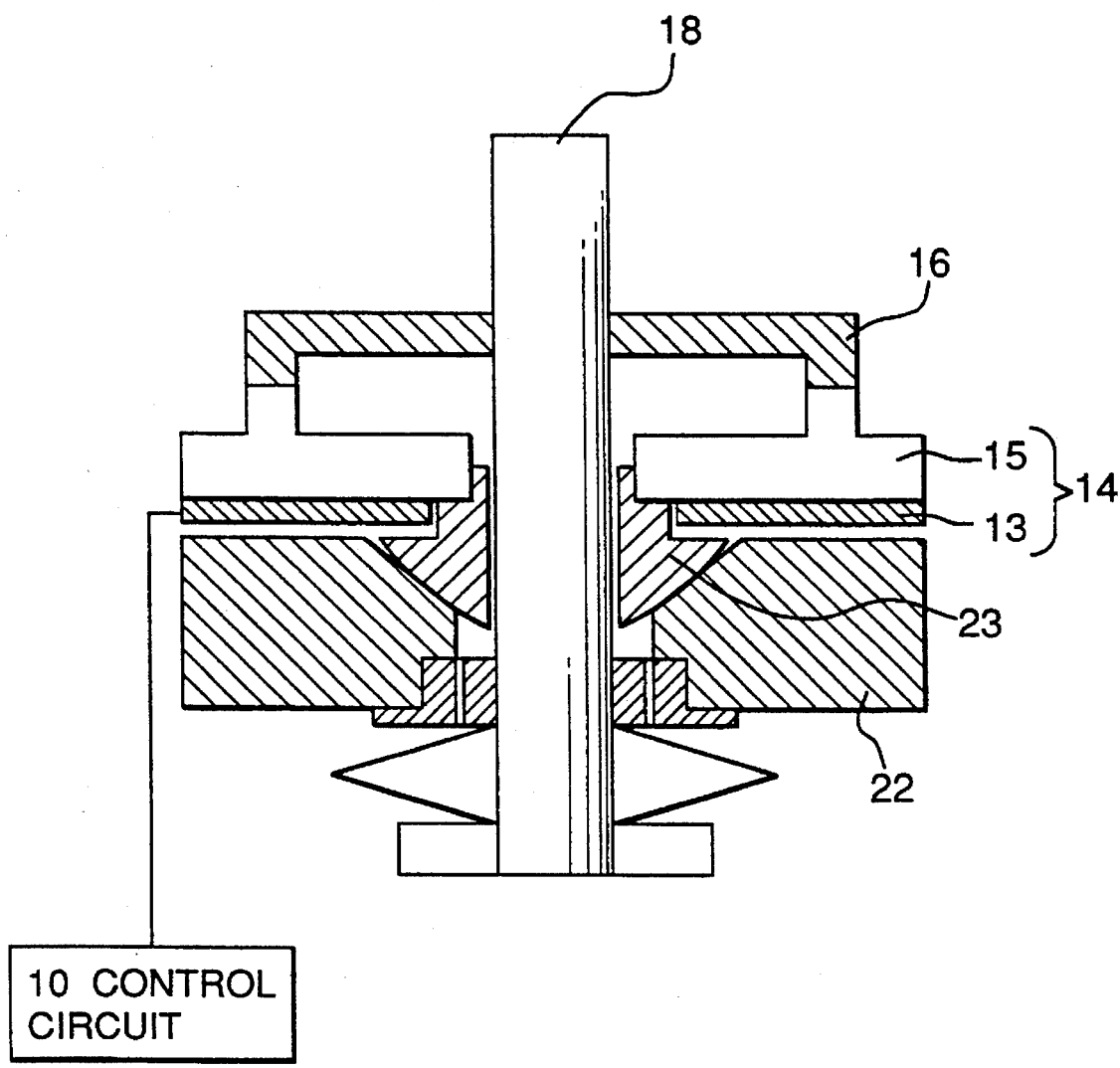
FIG. 8 is a sectional view of an ultrasonic motor in a second embodiment of the present invention.

FIG. 8 is a sectional view showing the construction of an ultrasonic motor in the second embodiment of the present invention. In FIG. 8, the difference between the second embodiment and the first embodiment is in that a support member 23 is used in the second embodiment. The support member 23 is secured at its one end to the inner peripheral portion of the vibrating member 14 and is provided at its other end with a sphere shaped portion of the support member. The sphere shaped portion of the support member is in contact with a conical face of a taper portion formed at the center of the support stand 22.

A through hole having an inside diameter a little larger than the diameter of the rotary shaft is formed at the central portion of the support member 23, and the rotary shaft 18 extended through the through hole is rotatably retained with a rotary bearing.

In the present embodiment, the second embodiment is different from the first embodiment in that a buffer material is not used between the vibrating member 14 and the support stand 22, both being in a non-contact condition between them.

In the first embodiment, the loss of the vibrating energies is caused because of the contact between the vibrating member 14 and the support stand 22 through the support member 21 of the buffer material. In the present embodiment, effective vibration energies to be obtained from the vibrating member 14 can be made larger without the energies loss being almost becoming caused.

As the spherical face of the support member 23 is adapted to come into contact with the conical face of the support stand 22, the support member 23 can be freely inclined in a condition where the support member is in contact with the conical face. Thus, the vibrating member 14 secured to the support member 23 can be also inclined freely. As the result, the contact condition between the moving member 16 and the projection of the elastic member 15 can be made uniform.

The form size relation of each portion is properly set (for example, difference between the inside diameter of the support member 23 and the outside diameter of the rotary shaft 18 is set properly large) so as to make the angular range where the inclination of the support member 23 can be effected. The present embodiment is much preferable in realizing the uniform contact condition between the moving member 16 and the vibrating member 14.

In the first embodiment, the change, as time passes, in the thickness of the support member is inevitable by the influences by the pressure force, for a long period of use, to the support member 21 composed of a buffer material. In the present embodiment, such size deformation is not caused, thus realizing an ultrasonic motor which is much higher in reliability than in the first embodiment.

Figure 9:
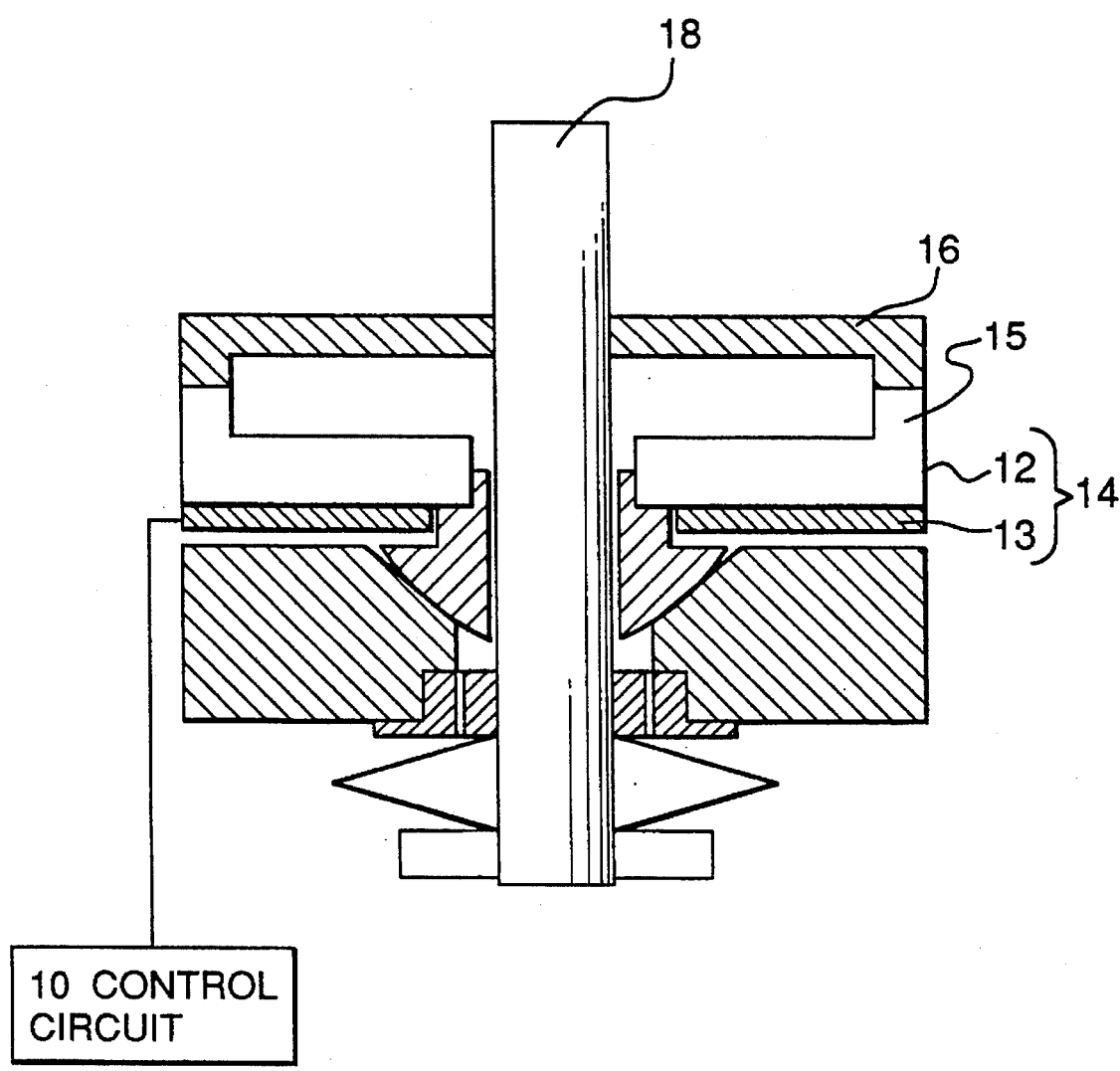
FIG. 9 is a sectional view of an ultrasonic motor showing another construction of the second embodiment of the present invention.

When the output torque, if it is not large, is sufficient, it is needless to say that the construction of FIG. 9 will do where the projection member 15 is formed on the external peripheral portion of the vibration member 14 as described in the first embodiment.

A third embodiment of the present invention will be described hereinafter in detail with reference to the drawings.

Figure 10:
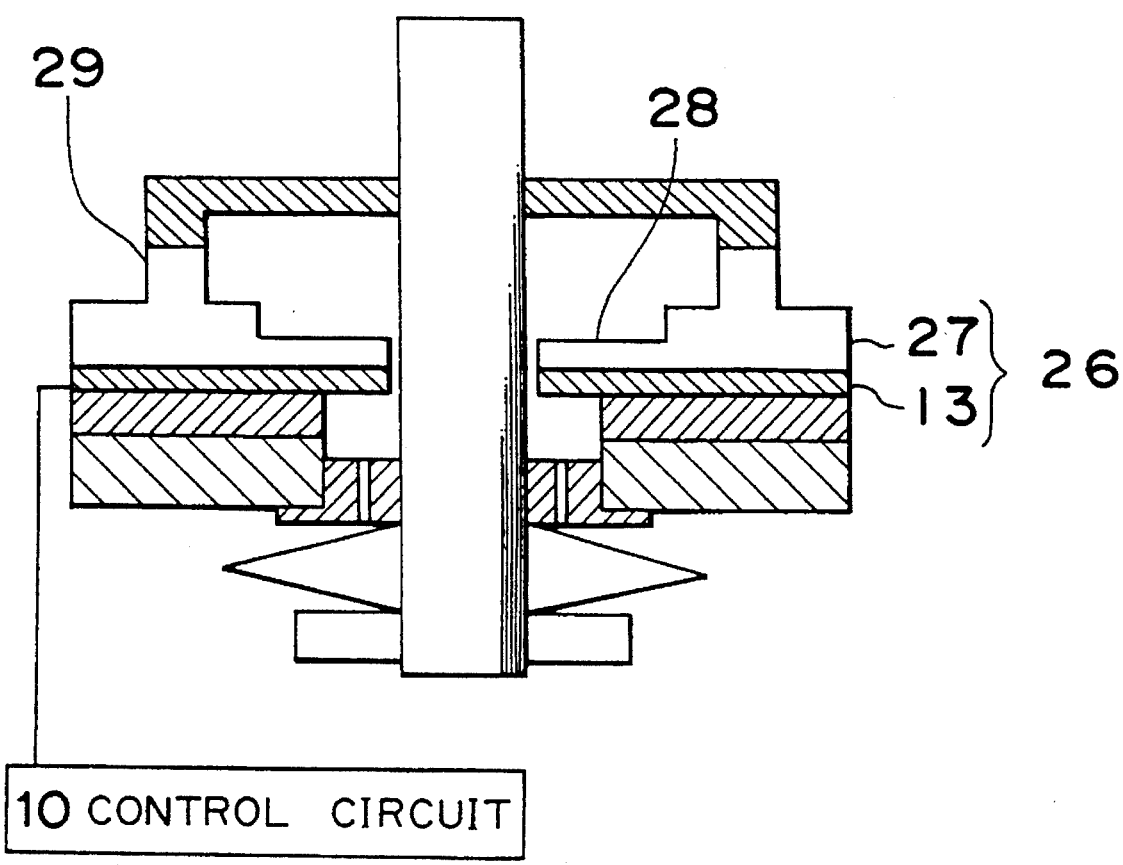
FIG. 10 is a sectional view of an ultrasonic motor showing a third embodiment of the present invention.

FIG. 10 is a sectional view of an ultrasonic motor in a third embodiment of the present invention. In FIG. 10, an elastic member 25 of the vibrating member 26 has a stage difference formed when seen in the radial direction on a face on the side where the projection member 29 is formed. The thickness of the elastic member is unequal because of thick portion 27 and thin portion 28 in plate. The thickness in the peripheral direction is equal. The other construction is the same as that of the first embodiment.

The third embodiment is similar in other construction to the first embodiment except that a plurality of projection members 29 are disposed, in the vibrating member 26, on the periphery near a position where a product of the speed distribution curve (time differential of the vibration displacement distribution curve) in the radial direction and the generation force distribution curve in the radial direction to be caused with respect to the external load in accordance with a principle described in the first embodiment become maximum.

In accordance with the third embodiment of the present invention, the generation force distribution curve can be optionally changed in the radial direction by change in the plate thickness of the elastic body 25. As the output maximum point can be freely set in accordance with the required characteristics of the ultrasonic motor, the position where the projecting member is formed can be freely selected correspondingly.

When an elastic member 27 of such a shape as shown in FIG. 10 is used, the generation force distribution curve described in FIG. 6(b) can be made gentler as compared with a case where the elastic member constant in thickness is used, namely, the change in the generating force can be made smaller so that the output maximum point of the vibrating member 26 can be provided in a more external portion.

A thinner portion 28 of a plate is formed in the inner peripheral portion so as to make the bending rigidity of the inner peripheral portion of the elastic member 26 smaller so that the vibration becomes easier to vibrate in the vibrating member 26. As a result, resonance resistance is lowered so as to enlarge the vibration displacement quantity, thus realizing the ultrasonic motor higher in efficiency.

Figure 11:
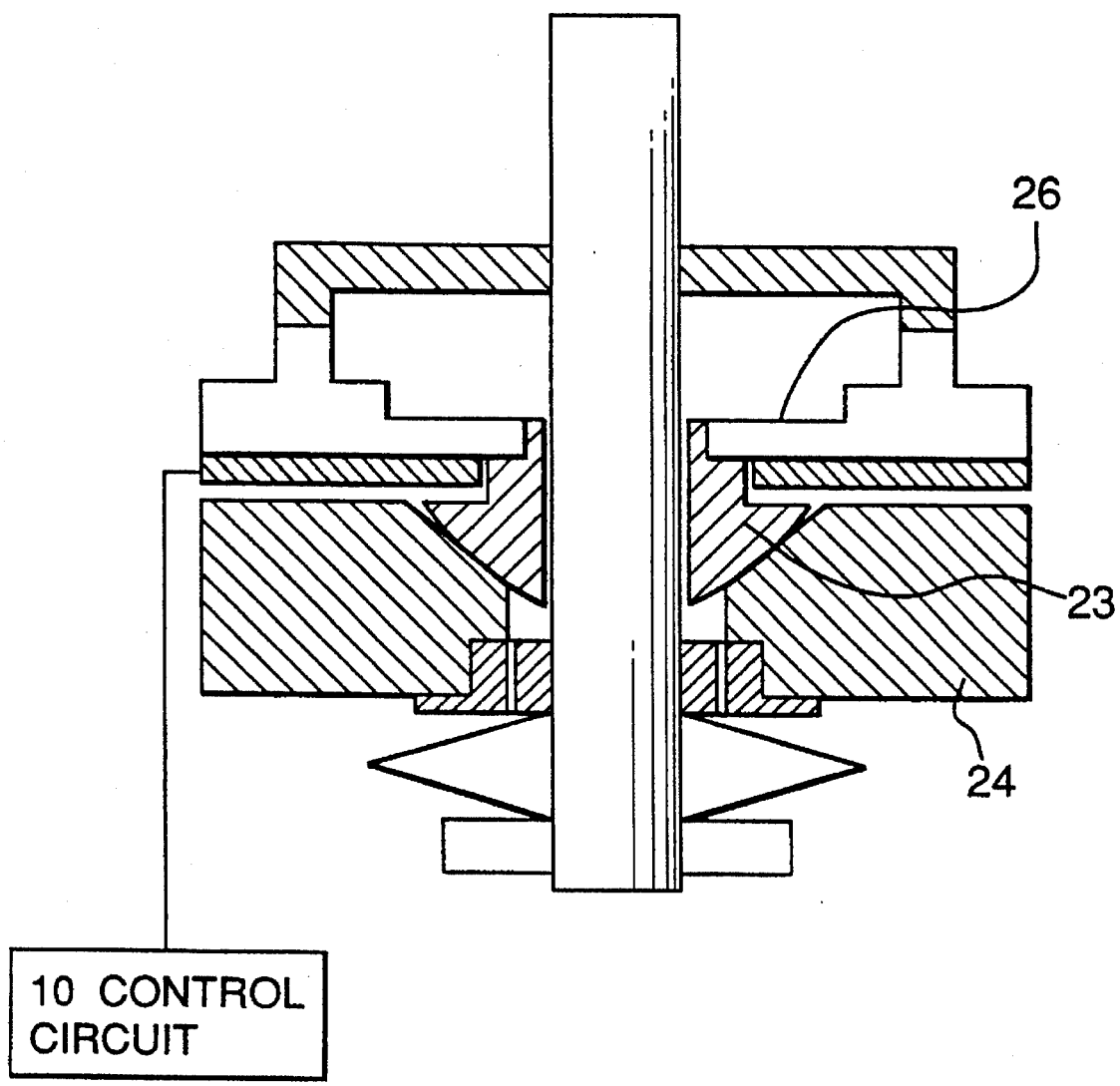
FIG. 11 is a sectional view of an ultrasonic motor showing another construction of the third embodiment of the present invention.

The construction of the ultrasonic motor in the present embodiment can be deformed as in, for example, FIG. 11. In this case, it is needless to say that such an effect as in the description of FIG. 9 can be obtained.

Although the thickness of the elastic member 25 is shown different in two portions in the present embodiment, it is needless to say that it may be changed continuously in the radial direction and changed in plate thickness in a plurality of locations.

A fourth embodiment of the present invention will be described hereinafter in detail with reference to the drawings.

Figure 12:
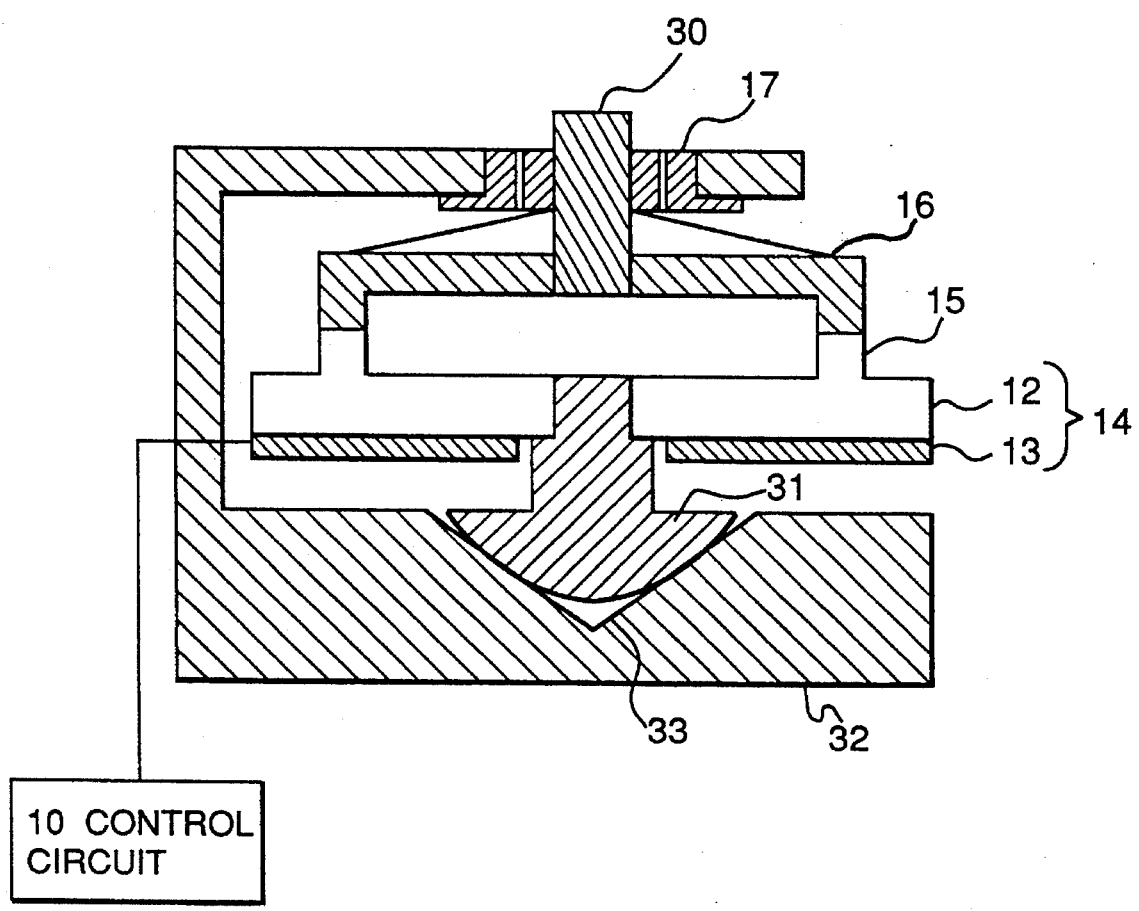
FIG. 12 is a sectional view of an ultrasonic motor showing a fourth embodiment of the present invention.

FIG. 12 is a sectional view of an ultrasonic motor in the fourth embodiment of the present invention. In FIG. 12, the difference between the second embodiment and the fourth embodiment is in that the rotary shaft 30 integrated with the moving member 16 is not penetrated through the vibrating member 14 in the second embodiment.

The vibrating member 14 and a support member 31 which has no through hole are fixedly inserted under pressure at one end of the support member 31 into the hole in the central portion of the vibrating member 14. The moving member 16 is pressed against the projecting member 15 of the vibrating member 12 by the pressure spring 23 in a compression condition. The pressure force is transferred to the support member 31 so as to bring the spherical portion of the support member into pressure contact with the conical surface of the support stand 32. The other construction is similar to that in the second embodiment.

In the present embodiment constructed as described hereinabove, a hole formed in the center of the elastic member 12 may be made small to insert under pressure one end portion of the support member 31. The volume of the vibrating member can be made larger as compared with the ultrasonic motor made of a vibrating member having a hole through which the rotary shaft is extended. The generating force of the vibrating member becomes larger. An ultrasonic motor capable of large outputs can be realized.

In order to fix the support member 31 to the elastic member 12, for example, a screw clamp, in addition to the pressure insertion, may be used. Or both of them may be integrally worked, molded.

Figure 13:
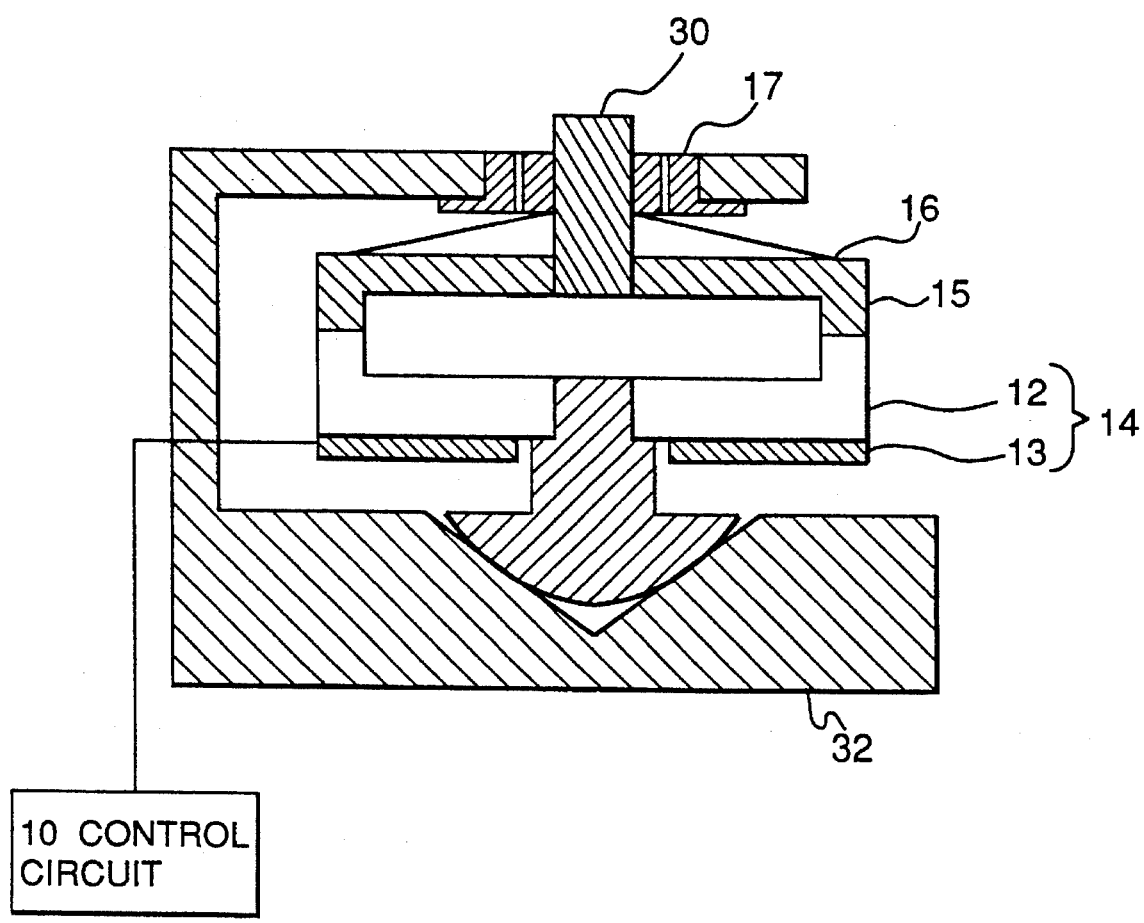
FIG. 13 is a sectional view of an ultrasonic motor showing another construction of the fourth embodiment of the present invention.

As shown in FIG. 13, it is needless to say that an ultrasonic motor of number of high revolutions, a low torque can be realized by the provision of the projecting member 15 on the external circumferential portion of the vibrating member 14 as in the first embodiment.

Figure 14A:
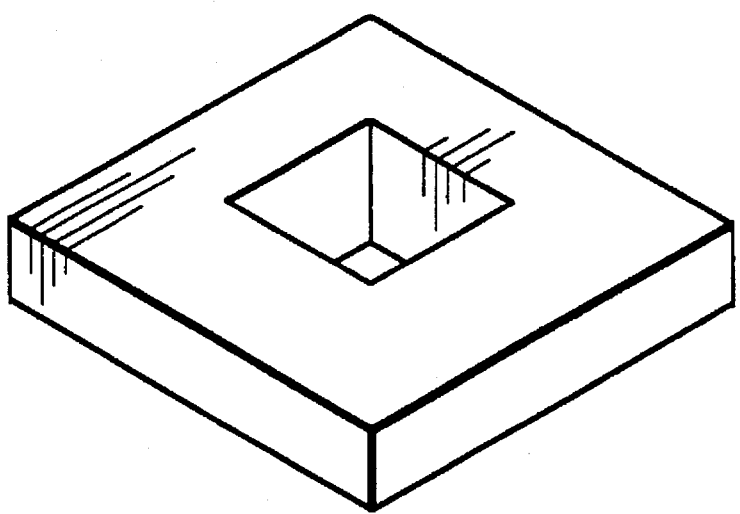
FIG. 14A and 14B are views each showing the construction of another support stand which can be used in each embodiment of the present invention.
Figure 14B:
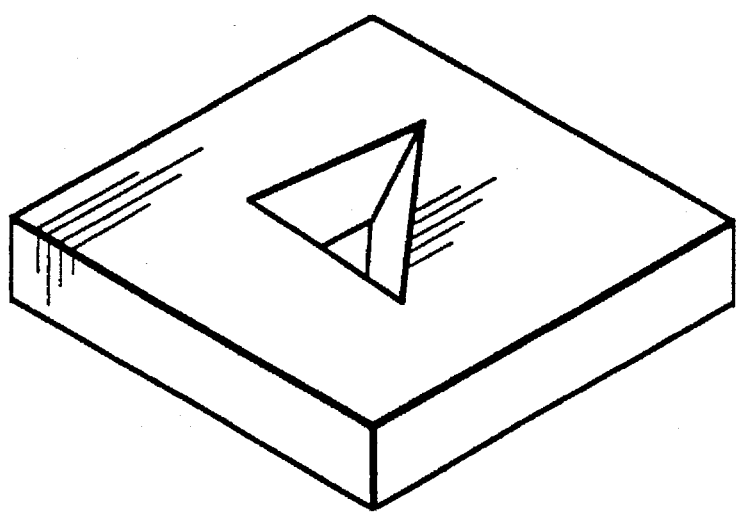

The construction of the conically shaped portion in the second through fourth embodiments of the present invention may be of a quadrangle or triangle conical taper shape as shown in FIGS. 14A and 14B. So long as the shape which is in contact at least three points with the spherical face portion of the support member, the shape thereof is not restricted.

Figure 15:
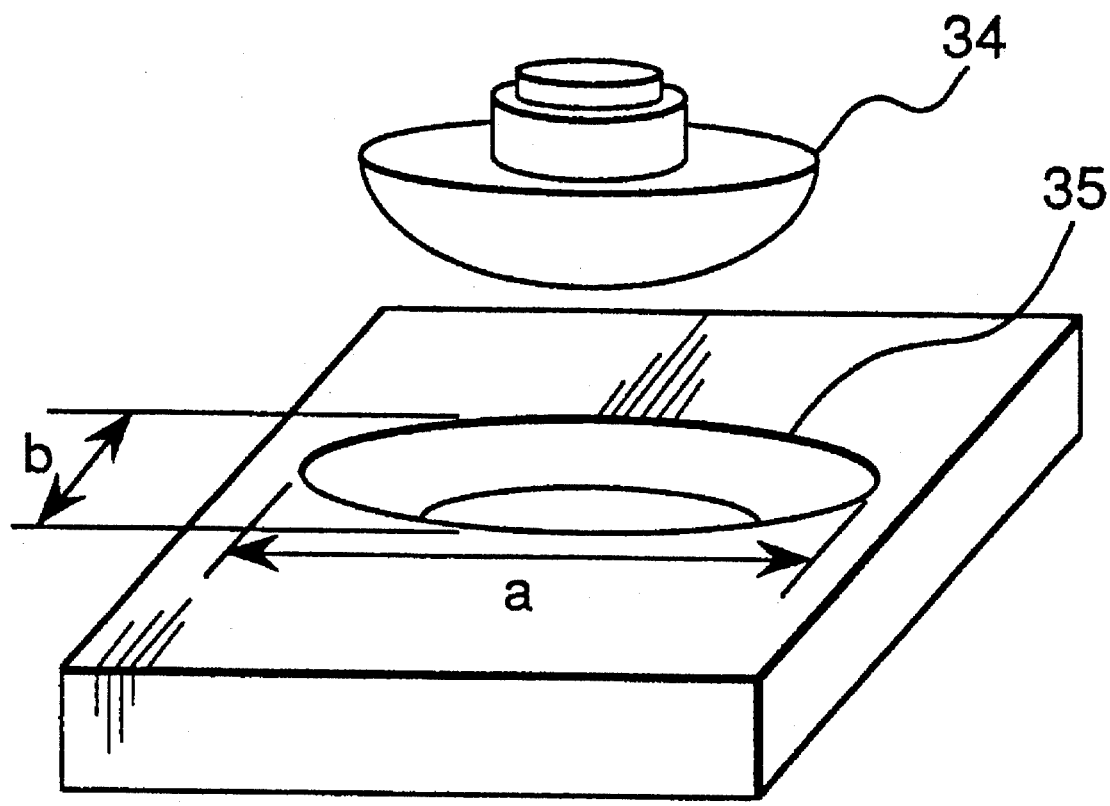
FIG. 15 is a view showing the construction of a still another support stand where a rotation suspending mechanism to be used in each embodiment of the present invention is provided.

The spherical face portion of the support member may be made elliptical 34 in shape as shown in FIG. 15 and the taper shape of the support stand may be made an elliptically taper shape portion composed of a major axis a and a major axis b.

The vibrating member receives as a reaction a force with which the vibrating member is made to rotate in a direction opposite to the rotation direction of the moving member from the rotating moving member. The force of the reaction is removed with a frictional force to be caused in the pressure contact portion between the spherical face portion of the support member and the conical face. As the support member is incapable of rotation when the conical face and the spherical face portion are made elliptical enough to match with respect to each other as described hereinabove, the rotation of the vibrating member in the opposite direction can be completely prevented in accordance with the above described reaction.

Although the vibration mode in the radial direction has been described with restriction to the primary mode in the above describe embodiment, the projecting member position can be determined even with respect to the secondary vibrating mode or more in the radial direction by application of a similar way of thinking, thus realizing the ultrasonic motor of large outputs.

Figure 16:
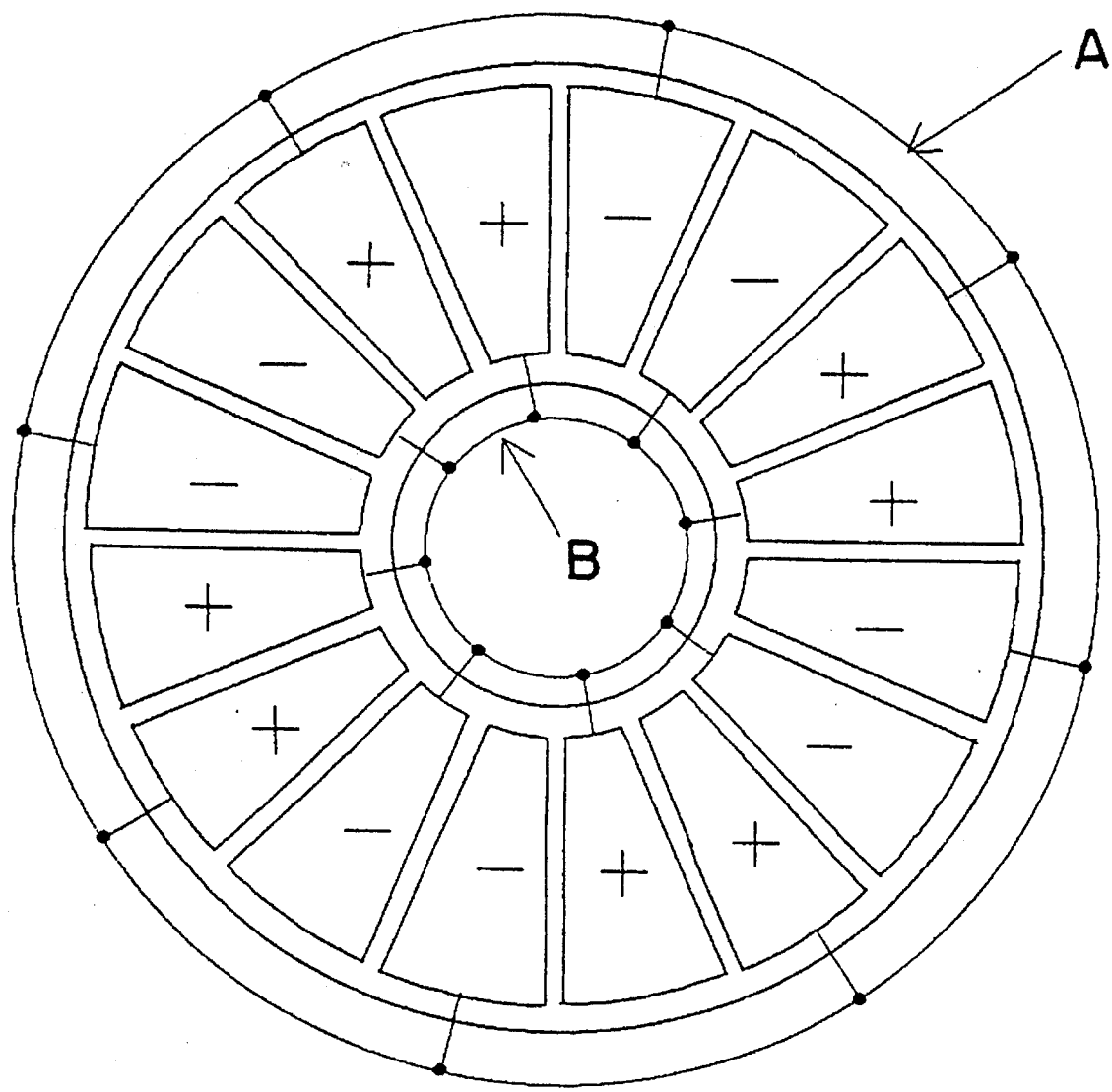
FIG. 16 is an electrode construction diagram of another piezoelectric member which can be used in each embodiment of the present invention.

The electrode construction of the piezoelectric member 13 in each of the above described embodiments is not restricted to that of FIG. 2. Electrodes of A and B phases can be disposed alternately uniformly in the peripheral direction as shown in, for example, FIG. 16. But the electrode construction is not be restricted to FIG. 16. In a case of the electrode construction of FIG. 16, such a portion which does not contribute towards the driving operation corresponding to three fourths of a wavelength as shown in FIG. 2 does not exist so that the driving force by the piezoelectric member 13 can be improved. The phase balance shift of the voltage currents of A, B phases can be made smaller because of alternate disposition of each phase even if unequal pressure condition is generated between the moving member and the elastic member by application of the force in a perpendicular direction with respect to the rotary shaft, thus realizing an ultrasonic motor capable of relative stability.

As is clear from the foregoing description, according to the arrangement of the present invention, in a vibrating member for exciting the primary elastic waves or more in the radial direction, and the tertiary elastic waves or more in the peripheral direction, an output to be obtained from the rotary shaft is made maximum by a construction where a projecting member is disposed in the maximum of the output curve to be obtained by the product of the speed distribution (time differential of the vibration displacement distribution) in the radial direction and the generation force distribution in the radial direction with respect to the given pressure force to be determined by the output torque necessary as the ultrasonic motor, a support member composed of an insulation material containing an air space, or a support member having a spherical construction, and a support stand construction having a taper shape, and an ultrasonic motor which is stable in motor characteristics and high in efficiency by the face correcting effect between the moving member and the vibrating member and a function for preventing the rotation of the vibrating member.

Although the present invention has been fully described by way of example with reference of the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An ultrasonic motor comprising:

a disk-shaped vibrator having a through-hole in a central portion thereof, and said vibrator including an elastic member having opposite surfaces, a piezoelectric member including electrodes secured to one of the surfaces of the elastic member, and a plurality of projecting members extending from the other surfaces of the elastic member;

a moving member facing said other of the surfaces of the elastic member and contacting said projecting members, said piezoelectric member being configured to excite elastic progressive waves of a primary or higher vibration mode propagating in the radial direction of the vibrator, and elastic progressive waves of a tertiary or higher vibration mode propagating in the peripheral direction of the vibrator when an alternating voltage is impressed across the electrodes thereof, to thereby drive said moving member, a support having a through hole in a central portion thereof, said support facing said piezoelectric member and supporting said vibrator said through-hole of the support including a portion that tapers from an end of the support facing towards said vibrator a rotary shaft secured to the moving member and extending from a central portion of the moving member through the through-hole of the vibrator and into the through-hole in the central portion of said a bearing disposed in the through-hole of the support and rotatably .supporting said rotary shaft;

pressure means for applying a force acting in the axial direction of said rotary shaft that urges said moving member into contact with said projecting members, said projecting members being disposed at a radial location on said other of the surfaces of said elastic member where an output of the vibrator is maximum in the radial direction, said output being a distribution in the radial direction of a product of speed and generation force at each location along the radial direction, the speed being the time differential of the displacement of the vibration in the radial direction, and the generation force being the force generated by the vibrator in reaction to the force transmitted thereto from said pressure means; and a support member having one end secured to said elastic member, said support member having a through-hole through which said rotary shaft extends, and said support member having another end defining a convex surface, said convex surface being urged by said pressure means into contact with a surface of said support defining the tapered portion of the through-hole of the support.

2. An ultrasonic motor as claimed in claim 1, wherein said elastic member has a thickness that varies in the radial direction of the vibrator, and said other of the surfaces of said elastic member has a stepped configuration that accounts for the varying thickness of the elastic member, whereby the varying thickness of the elastic member establishes a distribution of said generation force in the radial direction.

3. An ultrasonic motor as claimed in claim 2, wherein said convex surface is spherical and contacts a surface defining the tapered portion of the through-hole of said support at at least through points.

4. An ultrasonic motor as claimed in claim 2, wherein said convex surface has an elliptical sectional shape, and a surface defining the tapered portion of the through-hole of said support also has an elliptical sectional shape.

5. An ultrasonic motor as claimed in claim 1, wherein said convex surface is spherical and contacts a surface defining the tapered portion of the through-hole of said support at at least through points.

6. An ultrasonic motor as claimed in claim 1, wherein said convex surface has an elliptical sectional shape, and a surface defining the tapered portion of the through-hole of said support also has an elliptical sectional shape.

7. An ultrasonic motor comprising:

a disk-shaped vibrator having a through-hole in a central portion thereof, and said vibrator including an elastic member having opposite surfaces, a piezoelectric member including electrodes secured to one of the surfaces of the elastic member, and a plurality of projecting members extending from the other surfaces of the elastic member;

a moving member facing said other of the surfaces of the elastic member and contacting said projecting members, said piezoelectric member being configured to excite elastic progressive waves of a primary or higher vibration mode propagating in the radial direction of the vibrator, and elastic progressive waves of a tertiary or higher vibration mode propagating in the peripheral direction of the vibrator when an alternating voltage is impressed across the electrodes thereof, to thereby drive said moving member, a support having a through hole in a central portion thereof, said support facing said piezoelectric member and supporting said vibrator;

a rotary shaft secured to the moving member and extending from a central portion of the moving member through the through-hole of the vibrator and into the through-hole in the central portion of said support;

a bearing disposed in the through-hole of the support and rotatably supporting said rotary shaft;

pressure means for applying a force acting in the axial direction of said rotary shaft that urges said moving member into contact with said projecting members, said projecting members being disposed at a radial location on said other of the surfaces of said elastic member where an output of the vibrator is maximum in the radial direction, said output being a distribution in the radial direction of a product of speed and generation force at each location along the radial direction, the speed being the time differential of the displacement of the vibration in the radial direction, and the generation force being the force generated by the vibrator in reaction to the force transmitted thereto from said pressure means; and a support member interposed between said support and said vibrator, said support member comprising an insulating material containing air space, and wherein said vibrator contacts said insulating material and is supported by support via said support member, and said pressure means urges said vibrator against said insulating material such that friction between said insulating material and said vibrator retards a force tending to rotate said vibrator.

8. An ultrasonic motor as claimed in claim 7, wherein said elastic member has a thickness that varies in the radial direction of the vibrator, and said other of the surfaces of said elastic member has a stepped configuration that accounts for the varying thickness of the elastic member, whereby the varying thickness of the elastic member establishes a distribution of said generation force in the radial direction.

9. An ultrasonic motor as claimed in claim 8, wherein said insulating material is a felt.

10. An ultrasonic motor as claimed in claim 7, wherein said insulating material is a felt.

\* \* \* \* \*